United States Patent
Sugiura et al.

(10) Patent No.: US 6,644,730 B2
(45) Date of Patent: Nov. 11, 2003

(54) STORAGE TYPE SEAT FOR AUTOMOBILE AND SEAT STORAGE STRUCTURE

(75) Inventors: Sadao Sugiura, Anjo (JP); Atsushi Ohsugi, Toyota (JP); Hidehiko Fujioka, Fujisawa (JP); Hiroyuki Suzuki, Fujisawa (JP)

(73) Assignees: Takashimaya Nippatsu Kogyo Co., Ltd., Toyota (JP); Shiroki Kogyo Co., Ltd., Fujisawa (JP)

( * ) Notice: Subject to any disclaimer, the term of this patent is extended or adjusted under 35 U.S.C. 154(b) by 0 days.

(21) Appl. No.: 09/870,735

(22) Filed: Jun. 1, 2001

(65) Prior Publication Data

US 2001/0052718 A1 Dec. 20, 2001

(30) Foreign Application Priority Data

| Jun. 8, 2000 | (JP) | ......................................... 2000-172144 |
| Jun. 8, 2000 | (JP) | ......................................... 2000-172145 |
| Jul. 26, 2000 | (JP) | ......................................... 2000-225577 |

(51) Int. Cl.[7] ................................................. A47C 9/06
(52) U.S. Cl. ................. 297/15; 297/378.12; 297/344.1; 297/334; 297/331; 296/65.09
(58) Field of Search .............................. 297/15, 378.12, 297/344.1, 334, 331, 378.13, 335; 296/65.05, 65.09, 65.03, 69, 65.08, 65.16; 248/421

(56) References Cited

U.S. PATENT DOCUMENTS

| 4,699,418 A | * | 10/1987 | Plavetich ................... 296/65.09 |
| 4,736,985 A | * | 4/1988 | Fourrey et al. ................ 296/69 |
| 5,393,116 A | * | 2/1995 | Bolsworth et al. ......... 296/65.03 |
| 5,482,349 A | * | 1/1996 | Richter et al. ............. 296/65.09 |
| 5,577,805 A | * | 11/1996 | Glinter et al. ............. 296/65.03 |
| 5,662,368 A | * | 9/1997 | Ito et al. ..................... 248/503.1 |
| 5,941,591 A | * | 8/1999 | Tsuge et al. ............... 296/65.09 |
| 6,135,555 A | * | 10/2000 | Liu et al. ....................... 297/336 |
| 6,318,784 B2 | * | 11/2001 | Nishide ..................... 296/65.09 |
| 6,361,098 B1 | * | 3/2002 | Pesta et al. ................ 248/503.1 |
| 6,375,246 B1 | * | 4/2002 | Nicola et al. ............. 296/65.03 |
| 6,375,255 B1 | * | 4/2002 | Maruta et al. .................. 297/15 |
| 6,435,589 B2 | * | 8/2002 | Shimizu et al. ........... 296/65.05 |

FOREIGN PATENT DOCUMENTS

| JP | U 5-40029 | 5/1993 |
| JP | U 5-63968 | 8/1993 |
| JP | U 6-8061 | 2/1994 |
| JP | A 6-107050 | 4/1994 |
| JP | A 6-227301 | 8/1994 |
| JP | A 6-336146 | 12/1994 |
| JP | A 8-11602 | 1/1996 |
| JP | A 8-11677 | 1/1996 |
| JP | A 8-207627 | 8/1996 |
| JP | A 11-48840 | 2/1999 |

\* cited by examiner

Primary Examiner—Peter M. Cuomo
Assistant Examiner—Stephanie Harris
(74) Attorney, Agent, or Firm—Oliff & Berridge, PLC

(57) ABSTRACT

A storage type seat for an automobile is provided with a seat cushion having at least one leg portion, a lock mechanism operable to engage and disengage the at least one leg portion with and from a vehicle body floor, a seat back that can be folded down to a seat face of the seat cushion, a link member that links the seat with the vehicle body floor, the vehicle body floor having a recessed storage portion formed therein to the rear of the seat, the link member allowing the seat cushion and the seat back that are in a folded state to be stored in the recessed storage portion when the seat is not used, and allows the seat cushion and the seat back in the folded state to be returned to an original position for use so that the leg portion is brought into engagement with the vehicle body floor, a release permission mechanism which permits the leg portion of the seat cushion to be released from the vehicle body floor only when the seat cushion and the seat back are in the folded state, and a standing permission mechanism which permits the seat back of the seat in the folded state to be raised to a standing position only when the leg portion is locked on the vehicle body floor by the lock mechanism.

11 Claims, 15 Drawing Sheets

STORAGE TYPE SEAT FOR AUTOMOBILE AND SEAT STORAGE STRUCTURE

INCORPORATION BY REFERENCE

The disclosure of Japanese Patent Application Nos. 2000-172144, 2000-172145, and 2000-225577 filed on Jun. 8, 2000, Jun. 8, 2000, and Jul. 26, 2000, respectively including the specification, drawings and abstract is incorporated herein by reference in its entirety.

BACKGROUND OF THE INVENTION

1. Field of the Invention

The present invention relates to a storage type seat for an automobile, which allows the seat to be locked securely to a vehicle body when the seat is either in the useable or non-useable state for safety. Moreover, the present invention relates to a seat storage structure for an automobile, which allows the seat to be easily stored in a recessed storage portion formed in a vehicle body floor when the seat is not in the useable state. Moreover, the present invention relates to a seat storage structure for an automobile, which allows the seat to be easily stored in the recessed storage portion formed in the vehicle body floor when the seat is not in the useable state, and allows a load applied to a seat belt when the seat is stored to be reliably transmitted to the vehicle body floor.

2. Description of Related Art

Conventionally, Japanese Patent Application Laid-Open No. 11-48840 or Japanese Utility Model Application Laid-Open No. 5-400029 discloses a seat storage structure of this type in which a seat including a seat cushion and a seat back can be stored in the recessed storage portion formed in the vehicle body floor to the rear of the seat. These seats are of bench type structured to be secured to the vehicle body by engaging catchers attached to both side portions of the seat cushion with the corresponding strikers attached to side portions of the vehicle body when the seat is in the useable state.

The seat of the above type has an engagement mechanism that simply engages the catcher attached to the seat cushion side portion with the striker attached to the vehicle side portion. Therefore such engagement mechanism is likely to be used in an insufficient engagement state. Moreover, the complicated procedure is required to make sure whether or not the catcher is securely engaged with the striker, resulting in deteriorated handling convenience.

Further, the seat of, for example, a 50:50 division type may require a leg portion such that the height of the seat cushion at a divided portion is kept constant. In this case, the leg portion has to be locked/released reliably as well as the seat. However, the engagement mechanism such as the catcher and the striker is too simple to lock/release the leg portion.

In addition, in the state where the seat is stored, the striker is exposed to the exterior, thus deteriorating the outer appearance. Further, in the case of a seat for three occupants, a rear seat cushion frame is provided with an anchor plate of the seat belt at an intermediate portion thereof. In the case where a force is applied to the seat belt when the seat is stored, a rear rod portion of the seat cushion frame is likely to be pulled and bent. A frame reinforcement member may be provided to prevent the seat cushion frame from being pulled and bent. This, in turn, may increase the weight as well as the production cost.

Further, in case of the conventional seat storage structure, the seat stored in the recessed storage portion moves up and down owing to the vibration of the running vehicle, thus producing chattering noise, or failing to keep the luggage placed on the stored seat in a stable condition.

SUMMARY OF THE INVENTION

It is an object of the invention to provide a storage type seat for an automobile, which allows a seat having the seat back folded down to the seat cushion to be stored in a recessed storage portion formed in a vehicle body floor when the seat is not used. The storage type seat of the invention may provide excellent stability and enhanced safety by securely engaging the leg portion with the vehicle body floor.

It is another object of the invention to provide a seat storage structure for an automobile, which prevents a frame of the seat cushion from being pulled and bent by a seat belt owing to the force applied to the seat which is in a useable state.

It is further object of the invention to provide a seat storage structure for an automobile, which allows a folded seat (having the seat back folded down to the seat cushion) to be securely fixed in position within the recessed storage portion, and the operation for locking/releasing the folded seat to be performed easily.

A storage type seat for an automobile includes a seat cushion having at least one leg portion; a lock mechanism operable to engage and disengage the at least one leg portion with and from a vehicle body floor; a seat back that can be folded down to a seat face of the seat cushion; a link member that links the seat with the vehicle body floor, the vehicle body floor having a recessed storage portion formed therein to the rear of the seat, the link member allowing the seat cushion and the seat back that are in a folded state to be stored in the recessed storage portion when the seat is not used, and allows the seat cushion and the seat back in the folded state to be returned to an original position for use so that the leg portion is brought into engagement with the vehicle body floor; a release permission mechanism which permits the leg portion of the seat cushion to be released from the vehicle body floor only when the seat cushion and the seat back are in the folded state; and a standing permission mechanism which permits the seat back of the seat in the folded state to be raised to a standing position only when the leg portion is locked on the vehicle body floor by the lock mechanism.

A seat storage structure for an automobile includes a link member which links a seat including a seat cushion and a seat back with a vehicle body floor, and allows the seat back and the seat cushion that are in a folded state to be stored within a recessed storage portion formed in the vehicle body floor to the rear of the seat when the seat is not used; a seat cushion frame which serves as a base of the seat cushion; a bracket attached to an intermediate portion of a rear rod of the seat cushion frame, the bracket having a seat belt coupling portion that is coupled to at least one seat belt; and a folding rear leg having a distal end portion that is to be fixed to the vehicle body floor, and a base portion coupled with the bracket.

A seat storage structure for an automobile includes a link member which links a seat including a seat cushion and a seat back with a vehicle body floor, and allows the seat back and the seat cushion that are in a folded state to be stored within a recessed storage portion formed in the vehicle body floor to the rear of the seat; and a lock mechanism that fixes the seat stored in the recessed storage portion.

BRIEF DESCRIPTION OF THE DRAWINGS

The invention will be described in detail with reference to the accompanying drawings wherein.

DETAILED DESCRIPTION OF THE PREFERRED EMBODIMENTS

First Embodiment

Referring to FIGS. 1 to 10, a first embodiment of the invention will be described.

Figure 1:
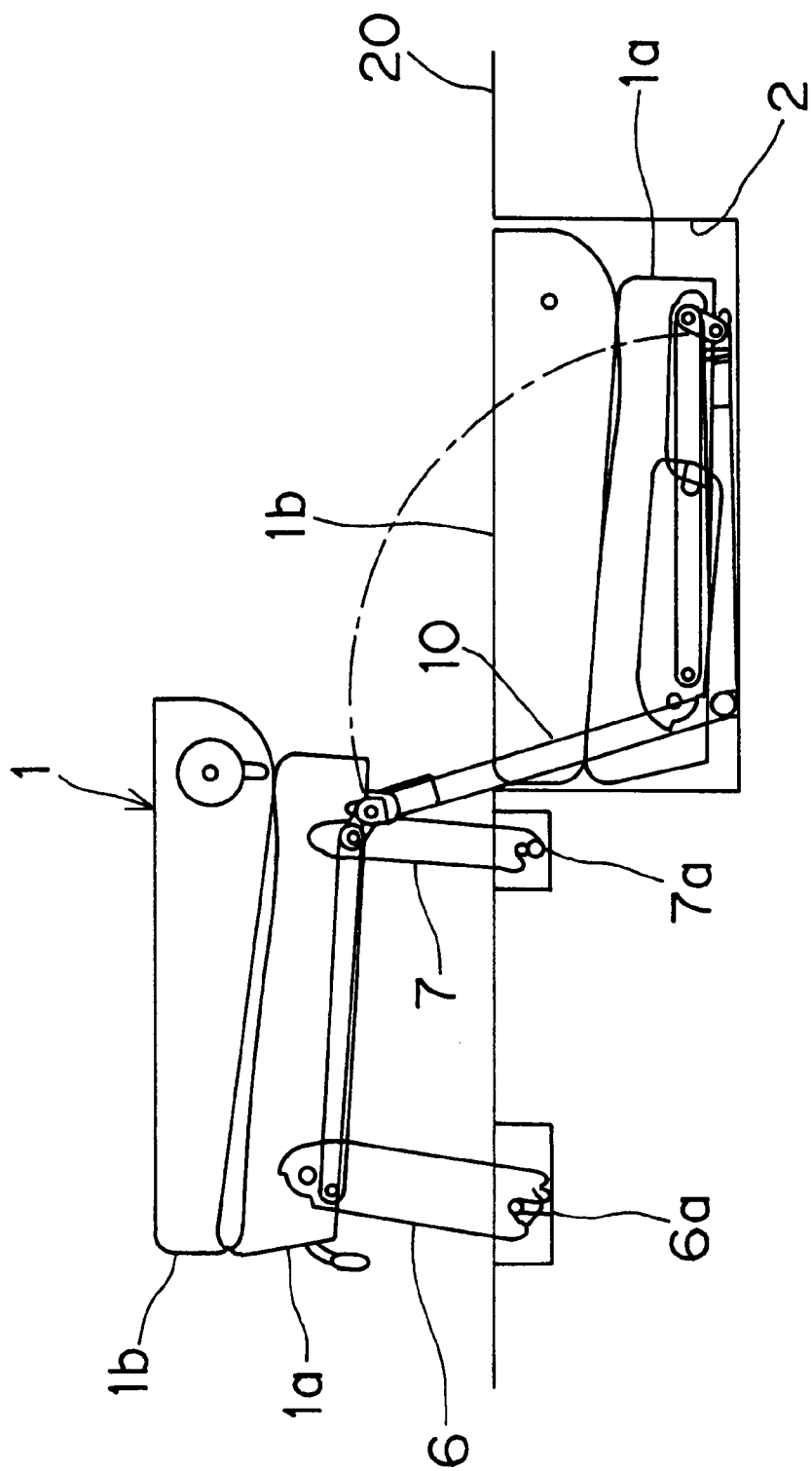
FIG. 1 is a side view showing a first embodiment of the invention.
Figure 2:
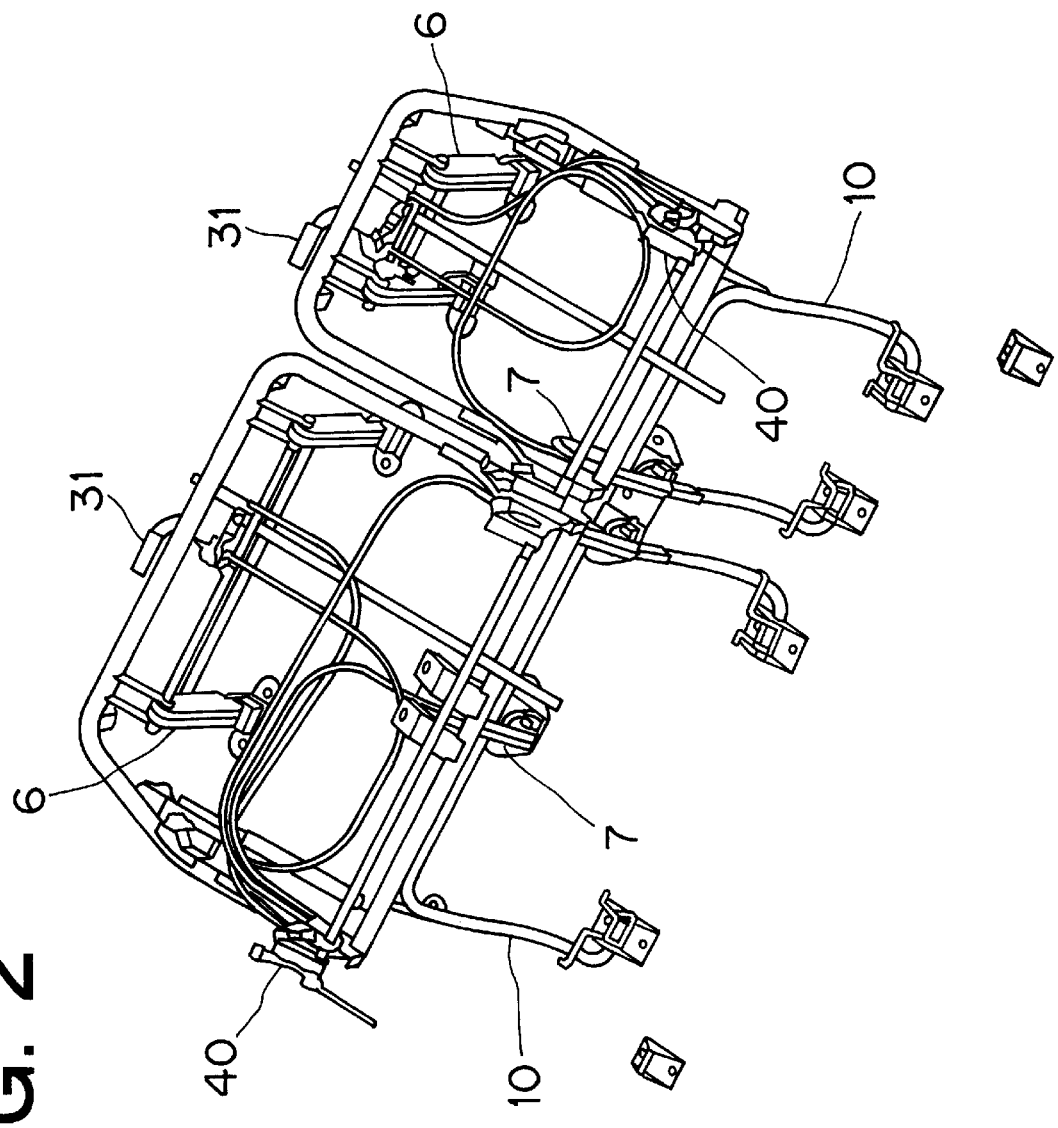
FIG. 2 is a perspective view showing an essential part of the first embodiment according to the invention.
Figure 3:
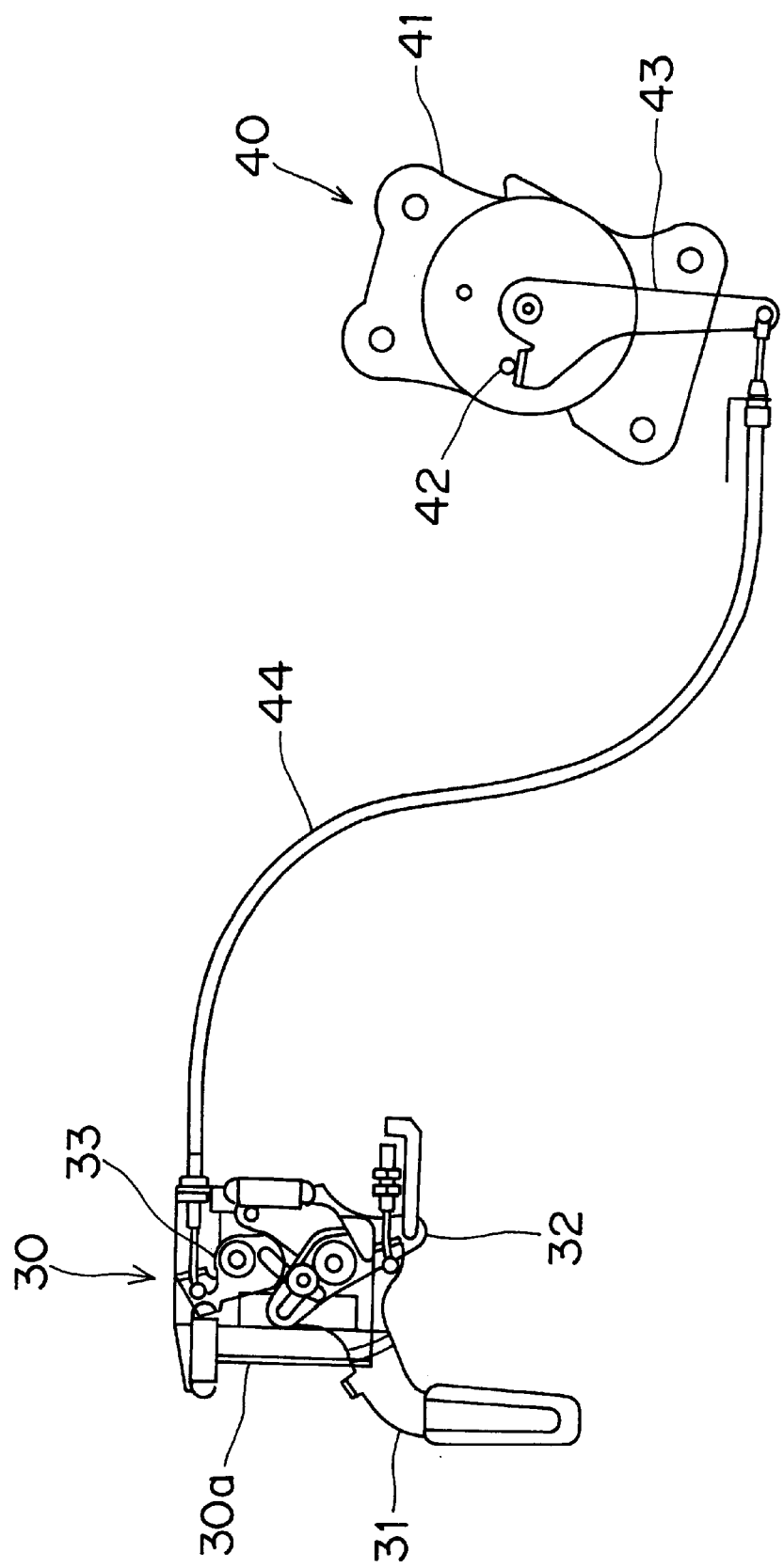
FIG. 3 is a schematic explanatory view showing a release permission mechanism of the first embodiment according to the invention.
Figure 9:
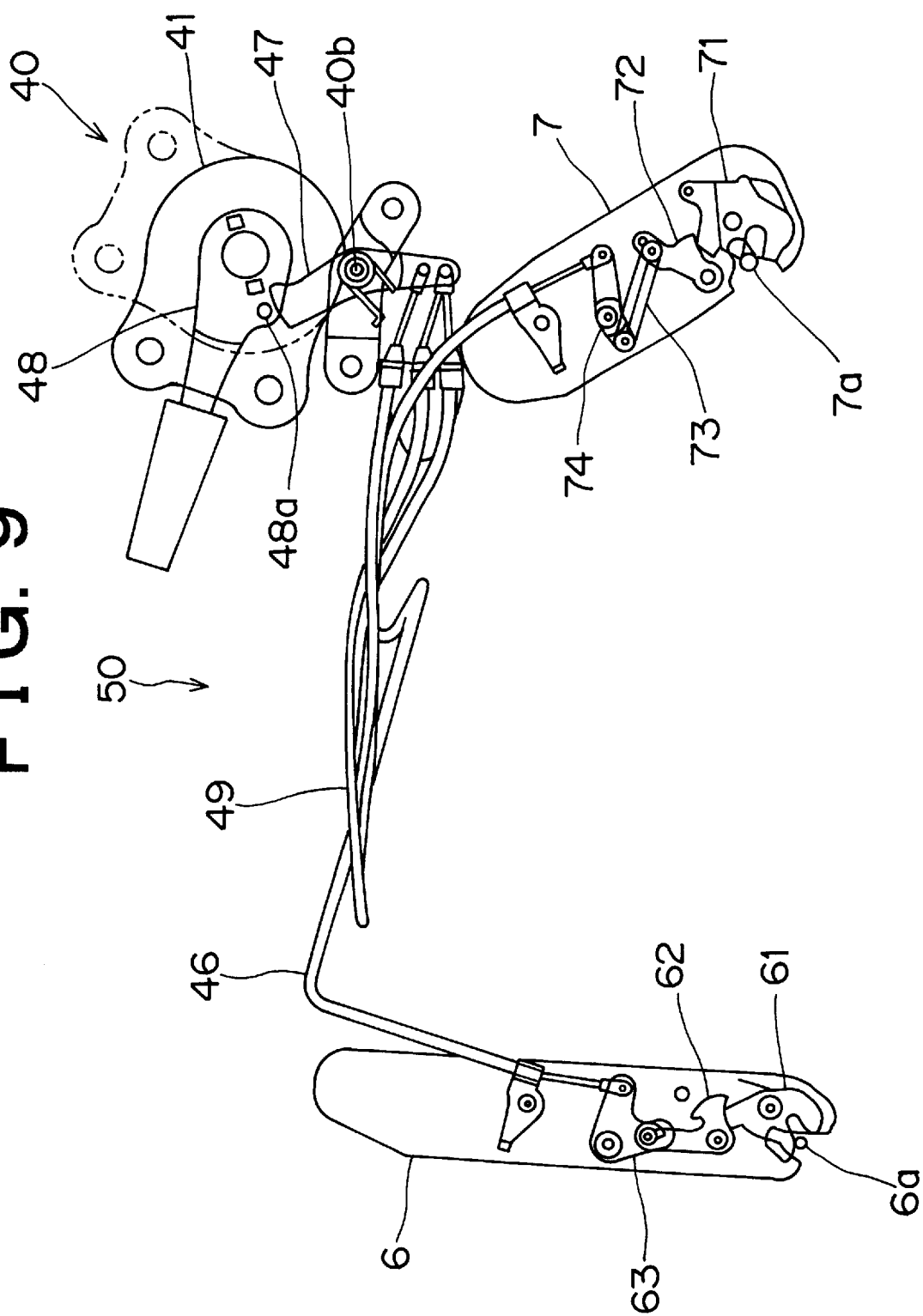
FIG. 9 is an explanatory view showing the operation state of a standing permission mechanism of the first embodiment according to the invention.

FIG. 2 shows a rear seat for an automobile that can be divided into 6:4, to which the invention has been applied. Referring to FIGS. 1 and 2, a seat 1 includes a seat cushion 1a provided with leg portions 6, 7 which can be locked to and released from the vehicle body floor 20 by a lock mechanism (described later), and a seat back 1b joined at the rear portion of the seat cushion 1a, which can be folded down and raised up by a reclining mechanism 40 (described layer). When the seat 1 is used, the folding leg portions 6, 7 are locked to the vehicle body floor 20 and, at the same time, the seat back 1b is raised up at the rear portion of the seat cushion 1a. When the seat 1 is not used, the leg portions 6, 7 are released from the vehicle body floor 20, and the seat back 1b is folded down to a seat face of the seat cushion 1a. The thus folded seat 1 can be stored in a recessed storage portion 2 formed in the vehicle body floor 20 to the rear of the seat 1 through a link member 10 that links the rear portion of the seat cushion 1a and the vehicle body floor 20. As shown in FIG. 3, the invention includes a release permission mechanism 30 that permits the lock state between the leg portions 6, 7 and the vehicle body floor 20 to be released by the lock mechanism only when it is confirmed that the seat back 1b has been folded down from a standing state. As shown in FIG. 9, the invention also includes a standing permission mechanism 50 that permits the seat back 1b in the folded state to be raised up only when it is confirmed that the leg portions 6, 7 have been locked to the vehicle body floor 20.

In the normal state in which the seat back 1b is not folded down, that is, an occupant is allowed to be seated, the release permission mechanism 30 does not permit the leg portions 6, 7 to be released from the vehicle body floor 20. On the other hand, when the folded seat 1 stored in the recessed storage portion 2 is returned to the original position, the standing permission mechanism 50 permits the seat back 1b to be raised up only when it is confirmed that the leg portions 6, 7 have been securely locked. The safety of the seat 1, thus, can be remarkably enhanced.

When using the seat, the leg portions 6, 7 are engaged with and fixed to the corresponding strikers 6a, 7a attached to the vehicle body floor 20. Meanwhile, when the seat is not used and stored, they can be folded into the seat cushion 1a so as not to be an obstacle. Referring to FIG. 1, the leg portions 6, 7 are provided at the front and rear portions of the seat cushion 1a. However, the leg portion 7 at the rear portion of the seat cushion 1a is not necessarily required.

Figure 4:
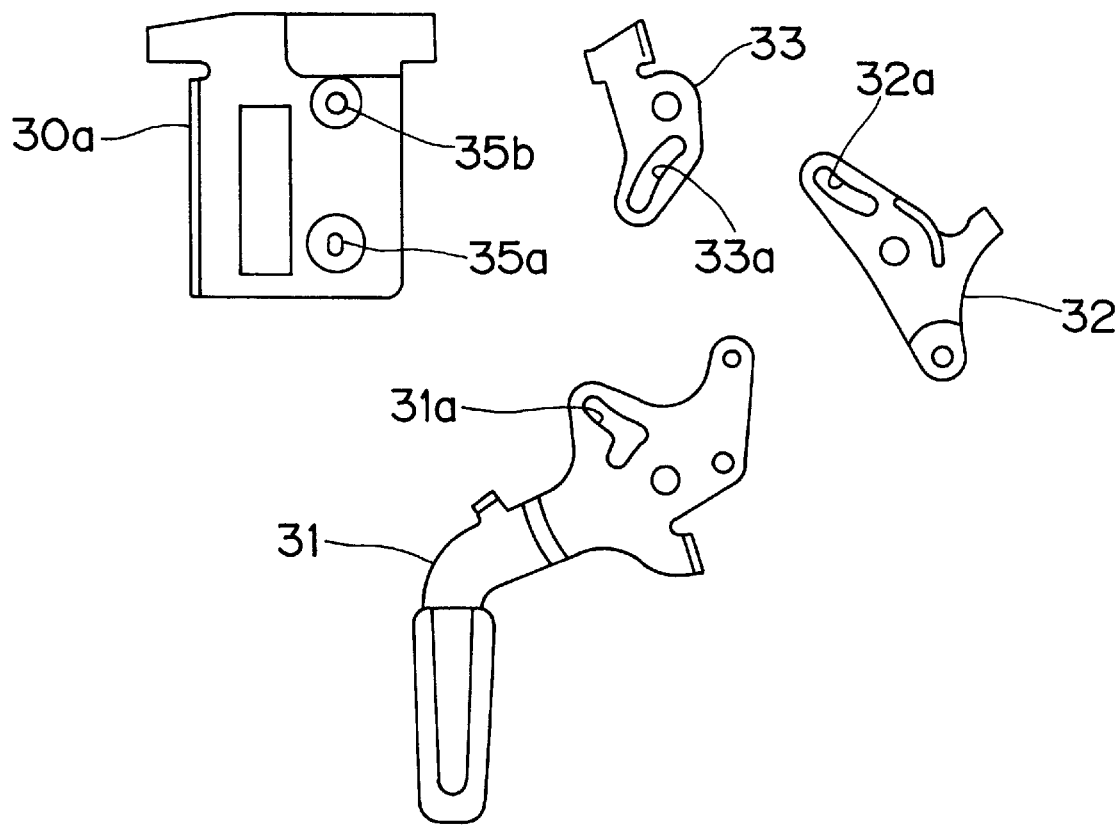
FIG. 4 is an explanatory view showing the release permission mechanism in the first embodiment according to the invention.
Figure 6:
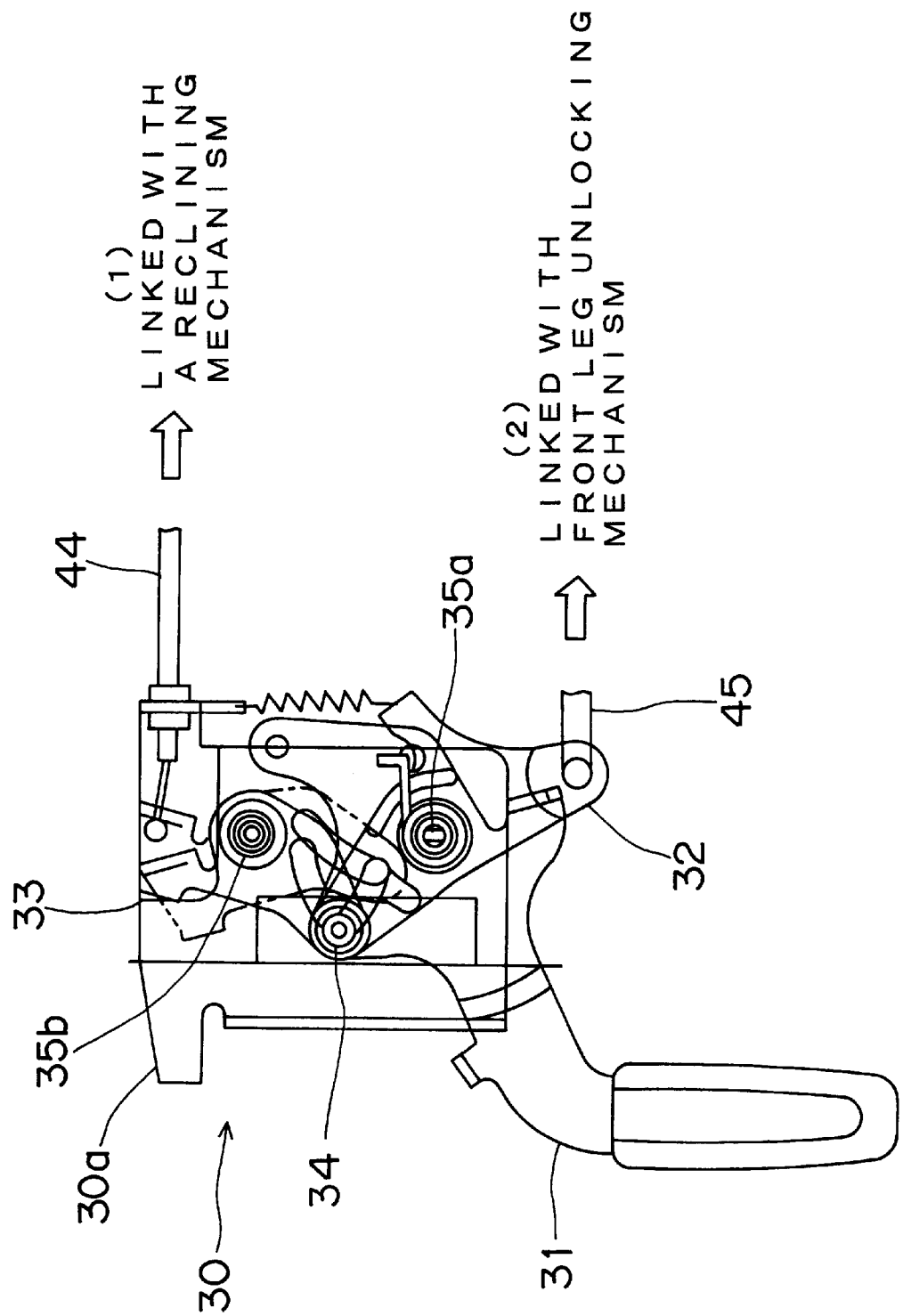
FIG. 6 is an explanatory view showing the operation state of the release permission mechanism of the first embodiment according to the invention.

The aforementioned release permission mechanism 30 is, as shown in FIGS. 4 and 6, formed by assembling a control lever 31, an open lever 32 and a cancel lever 33 on a bracket 30a. The control lever 31 serves to bring the leg portions 6, 7 into a releasable state, and is attached to the bracket 30a rotatively around a shaft 35a. In addition, the control lever 31 has an L-like shaped long hole 31a which is formed by combining the holes in the circumferential direction and the normal direction with respect to the shaft 35a. The open lever 32 is coupled with the lock mechanism and rotates clockwise around the shaft 35a to release the leg portions 6, 7 from the vehicle body floor. The open lever 32 has a long hole 32a formed in the normal direction to the shaft 35a. The cancel lever 33 rotates clockwise around the shaft 35b when it is pulled by a cable at a timing when the seat back 1b is folded down. The cancel lever 33 has a long hole 33a formed in the circumferential direction with respect to the shaft 35a. The control lever 31, open lever 32 and cancel lever 33 have a cancel pin 34 inserted in the respective long holes 31a, 32a, and 33a so as to be integrated with the bracket 30a.

Figure 5:
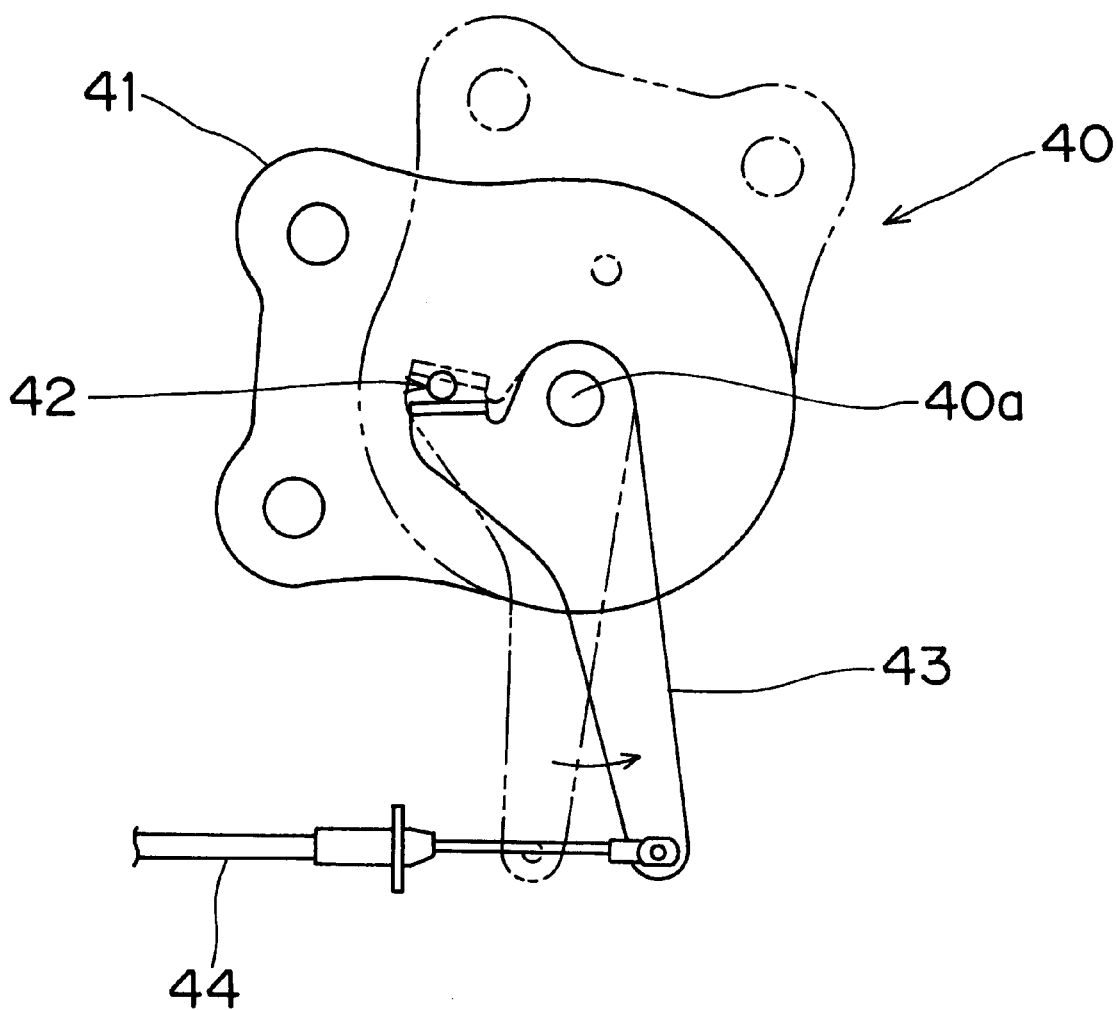
FIG. 5 is a schematic view showing a reclining mechanism in the first embodiment according to the invention.

FIG. 5 shows a reclining mechanism 40 by which the seat back 1b is folded down to the seat face of the seat cushion 1a. It is structured to operate interlocked with the seat back release permission mechanism 30.

When folding the seat back 1b down to the seat cushion 1a by the reclining mechanism 40, a ratchet 41 rotates around the shaft 40a, a seat back pin 42 provided on the ratchet 41 rotates a seat back link 43 counterclockwise, and then pulls the cancel lever 33 of the release permission mechanism 30 linked with a cable 44. Being pulled in the aforementioned way, the cancel lever 33 rotates clockwise, bringing the release permission mechanism 30 into the operable state.

Now, the operation of the release permission mechanism 30 will be described.

Figure 7:
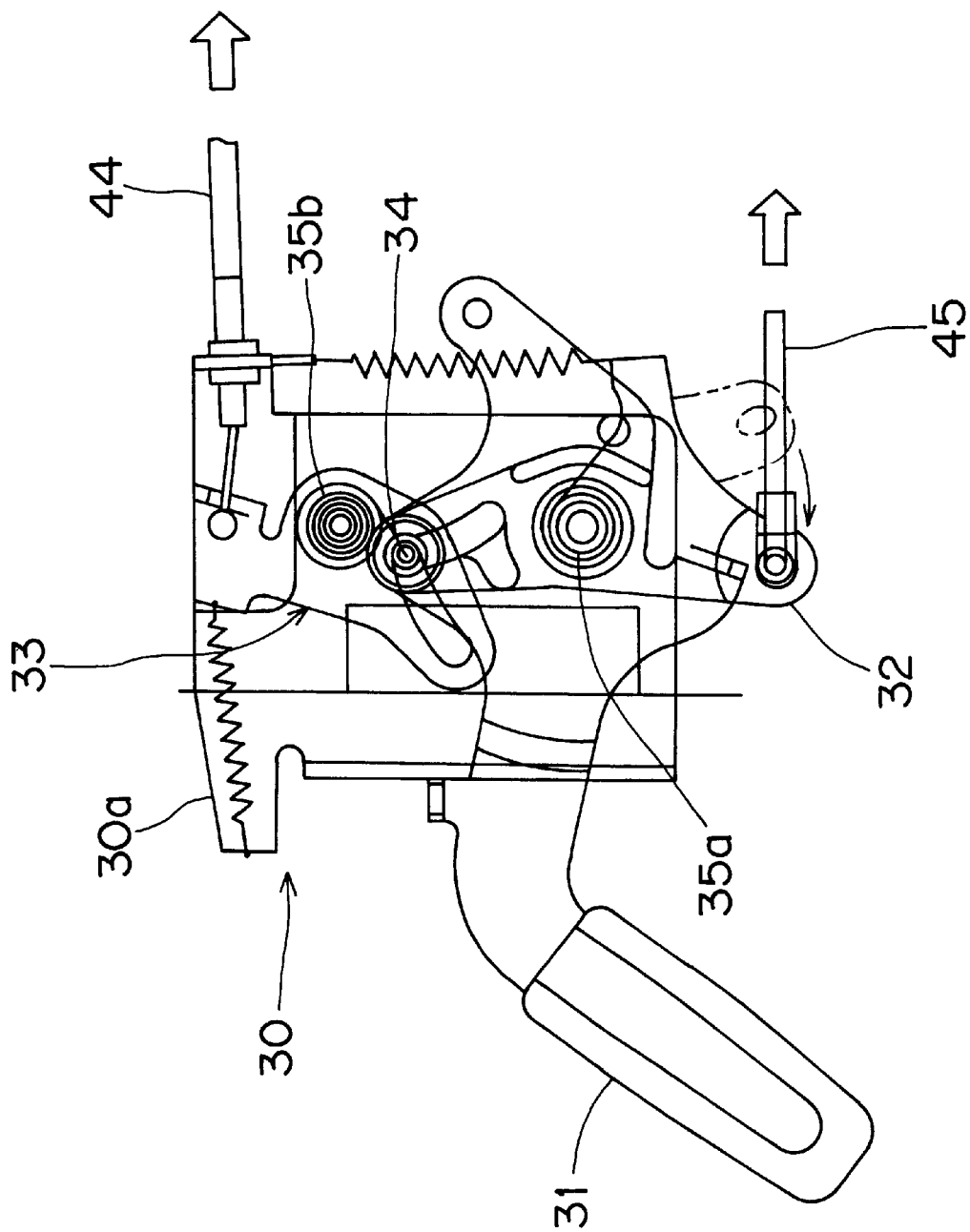
FIG. 7 is an explanatory view showing the operation state of the release permission mechanism of the first embodiment according to the invention.

As shown in FIG. 5, when the seat back 1b is folded down by the reclining mechanism 40, the ratchet 41 rotates counterclockwise such that the seat back pin 42 rotates a seat back link 43 counterclockwise to pull the cable 44. As shown in FIG. 6, the cancel lever 33 of the release permission mechanism 30 is pulled and rotates around the shaft 35*b*. At the same time, the cancel pin 34 is guided into the long hole 33*a* to move in the normal direction with respect of the shaft 35*a*. As shown in FIG. 7, the cancel pin 34 is pushed at the end face of the long hole 31*a* in the normal direction by operating the control lever 31. The cancel pin 34 then pushes the end face in the normal direction of the long hole 32*a* provided at the open lever 32. As a result, the open lever 32 rotates clockwise around the shaft 35*a*, pulls the cable 45 and release the leg portions 6, 7.

Figure 8:
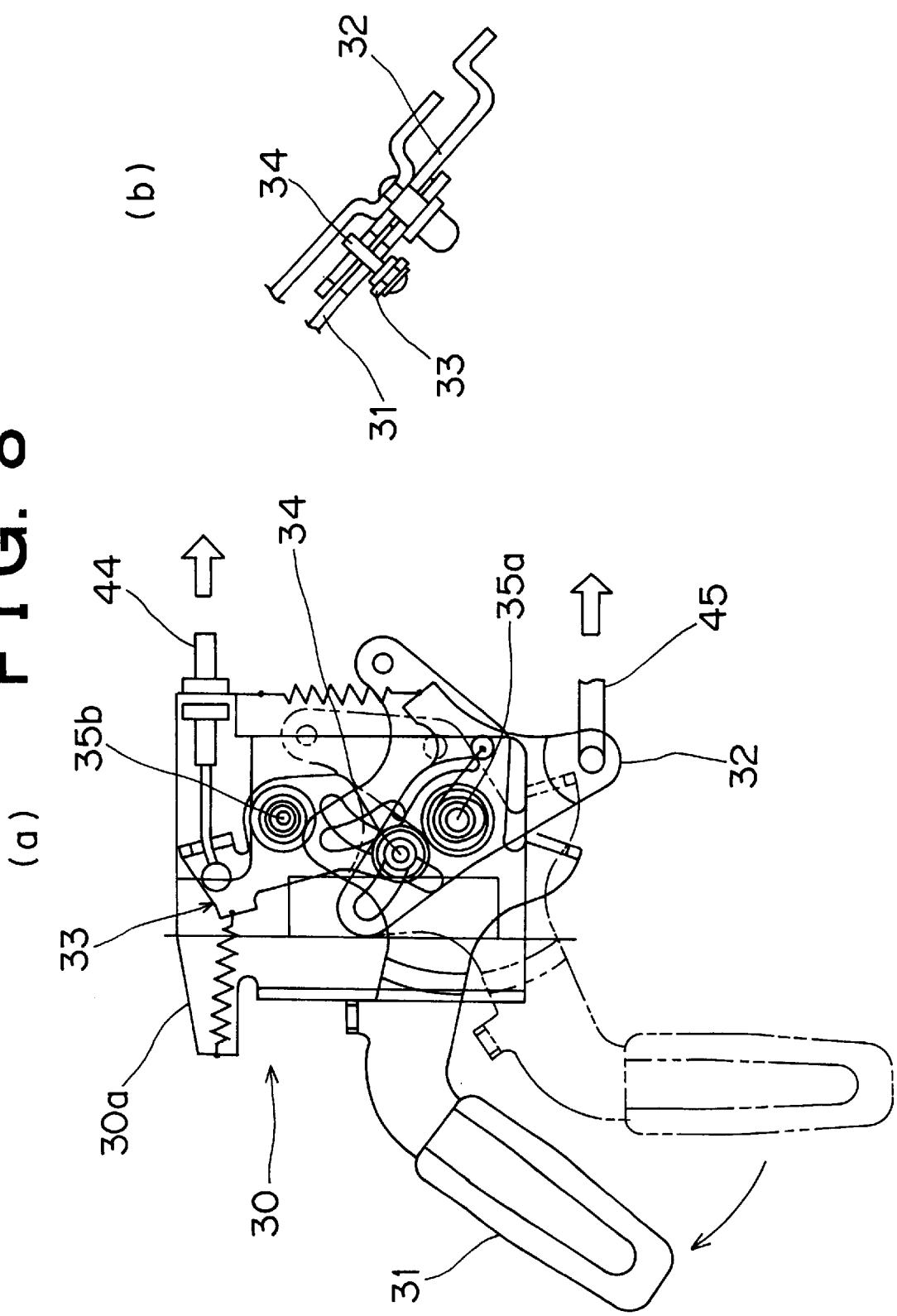
FIG. 8 is an explanatory view showing the operation state of the release permission mechanism of the first embodiment of the invention.

When the seat back 1*b* is not in the folded state, as shown in FIG. 8, the cancel pin 34 held by the cancel lever 33 is positioned in the circumferential direction of the long hole 31*a* provided on the control lever 31. Accordingly, even when the control lever 31 is operated, the cancel pin 34 can not be pushed in the circumferential direction of the long hole 31*a*. Therefore, the open lever 32 can not be rotated clockwise even when the control lever 31 is operated in the state where the seat back 1*b* is not folded down. Therefore, it is impossible to release the leg portions 6, 7.

Figure 10:
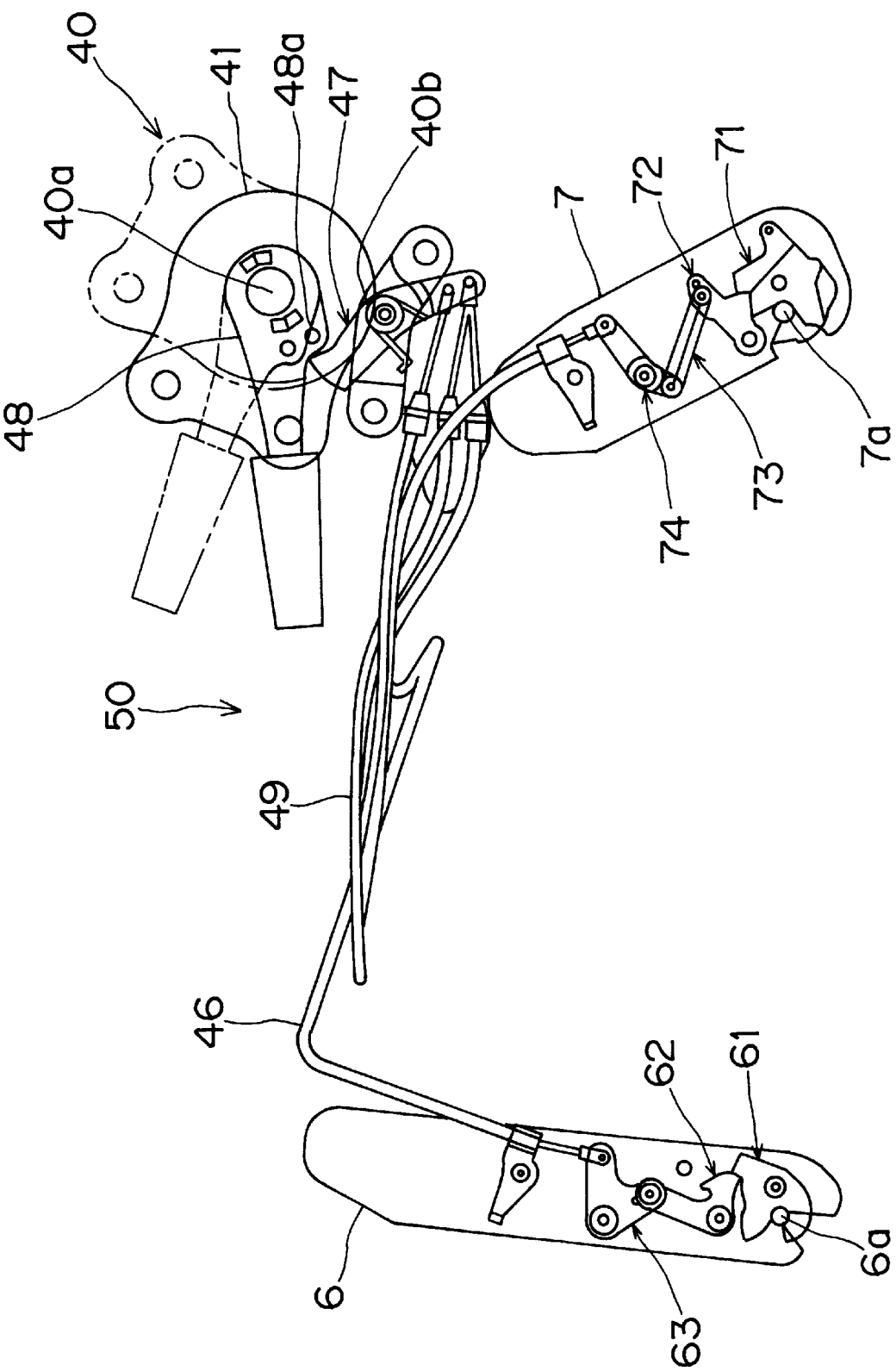
FIG. 10 is an explanatory view showing the operation state of a standing permission mechanism of the first embodiment according to the invention.

Meanwhile, the aforementioned standing permission mechanism 50, as shown in FIGS. 9 and 10, controls the lock state of the leg portions 6, 7 associated with the reclining mechanism 40. The seat back 1*b* is not allowed to be raised up unless ends of the leg portions 6, 7 attached to the bottom of the folded seat that has been returned from the recessed storage portion 2 to the rear of the seat 1 to the original position are securely locked to the lock mechanism including strikers 6*a*, 7*a* attached to the vehicle body floor 20.

To be more specific, a latch 61 engaged with the striker 6*a* and a pole 62 meshed with the latch 61 are provided in the leg portion 6 at the front side. The operation of the pole 62 is transmitted to a guard link 47 provided in the reclining mechanism 40 through a cable 46 by a link 63. Meanwhile, the leg portion 7 at the rear side is provided with a latch 71 engaged with the striker 7*a* and a pole 72 meshed with the latch 71. The operation of the pole 72 is transmitted to the guard link 47 provided in the reclining mechanism 40 through a cable 49 by two links 73, 74.

As shown in FIG. 9, the reclining mechanism 40 is provided with a stopper pin 48*a* on a release arm 48 projecting therefrom for operating the latchet 41 so as to be engageable with the guard link 47.

The operation of the standing permission mechanism 50 will be hereinafter described.

Referring to FIG. 9, in the state where the leg portion 6 is not engaged with the striker 6*a*, the pole 62 is positioned on a convex portion of the latch 61, and the link 63 pulls the guard link 47 through the cable 46. Similarly, in the state where the leg portion 7 is not engaged with the striker 7*a*, the pole 72 is positioned on a convex portion of the latch 71, and the links 73, 74 pull the guard link 47 through the cable 49. This tension force rotates the guard link 47 clockwise around the shaft 40*b*. In order to standing the seat back 1*b*, the reclining mechanism 40 has to be released by rotating the release arm 48 counterclockwise. However, as the guard link 47 has been pulled, which may prevent the movement of the stopper pin 48*a*, the releasing operation of the reclining mechanism 40 cannot be performed. As a result, when at least one of the leg portions 6 and 7 is not engaged with the corresponding strikers 6*a* and 7*a*, the seat back 1*b* can not be raised up.

On the other hand, when the leg portion 6 is engaged with the striker 6*a*, as shown in FIG. 10, the pole 62 meshes with the recessed portion of the latch 61. In this state, the cable 46 is brought into a free state and does not pull the guard link 47. Similarly, when the leg portion 7 is engaged with the striker 7*a*, the pole 72 also meshed engaged with the recessed portion of the latch 71. In this state, the cable 46 is brought into the free state and does not pull the guard link 47. When the release arm 48 of the reclining mechanism 40 is turned counterclockwise to raise the seat back 1*b*, the guard link 47 does not interfere with the movement of the stopper pin 48*a*. As a result, the reclining mechanism 40 can be reliably released. In the case where the leg portions 6, 7 are engaged with the respective strikers 6*a*, 7*a*, the seat back 1*b* can be raised up.

When storing the seat 1, it is brought into the position such that a back of the seat back 1*b* becomes flush with the vehicle body floor 20. This makes it possible to form a wide and flat luggage space on the vehicle body floor 20. In addition, as shown in FIG. 2, the link member 10 is formed integrally with a substantially U shaped frame in the plan view. The link member 10 is different from the conventional bar shaped link member that merely links a bottom rear portion of the seat cushion 1*a* and a bottom front portion of the recessed storage portion 2. Therefore, in this embodiment, reclining the seat 1 causes no rotation nor oscillation, which allows the seat to be reliably lifted in a stable state.

As shown in FIG. 1, the aforementioned structure is basically identical to the conventional structure in that the seat back 1*b* of the seat 1 that can be brought into the useable state when required is folded down to the seat cushion so as to be stored in the recessed storage portion 2 to the rear of the vehicle body by the link member 10 for making the luggage space. However, the present invention is provided with the release permission mechanism 30, by which the leg portions 6, 7 on the lower portion of the seat cushion 1*a* can be released only when it is confirmed that the seat back 1*b* is folded down. In addition, the present invention is further provided with the standing permission mechanism 50 that will not allow the seat back 1*b* to be raised up even when the folded seat 1 is simply returned to its original position from the recessed storage portion 2. The standing permission mechanism 50 allows the seat back 1*b* to be raised up only when it is confirmed that the leg portions 6, 7 are locked. As a result, this makes it possible to perform safe operation for bringing the seat into the useable or non-useable state by securely locking the leg portions 6, 7.

As it is evident from the foregoing description, when the seat is not in the useable state, the seat back can be folded down to the seat cushion so as to be stored easily within the recessed storage portion formed in the vehicle body floor. Additionally the present invention provides the safe operation for bringing the seat into the useable state by allowing the seat to be raised up only when it is confirmed that the leg portions are securely fixed to the vehicle body floor.

Second Embodiment

Figure 11:
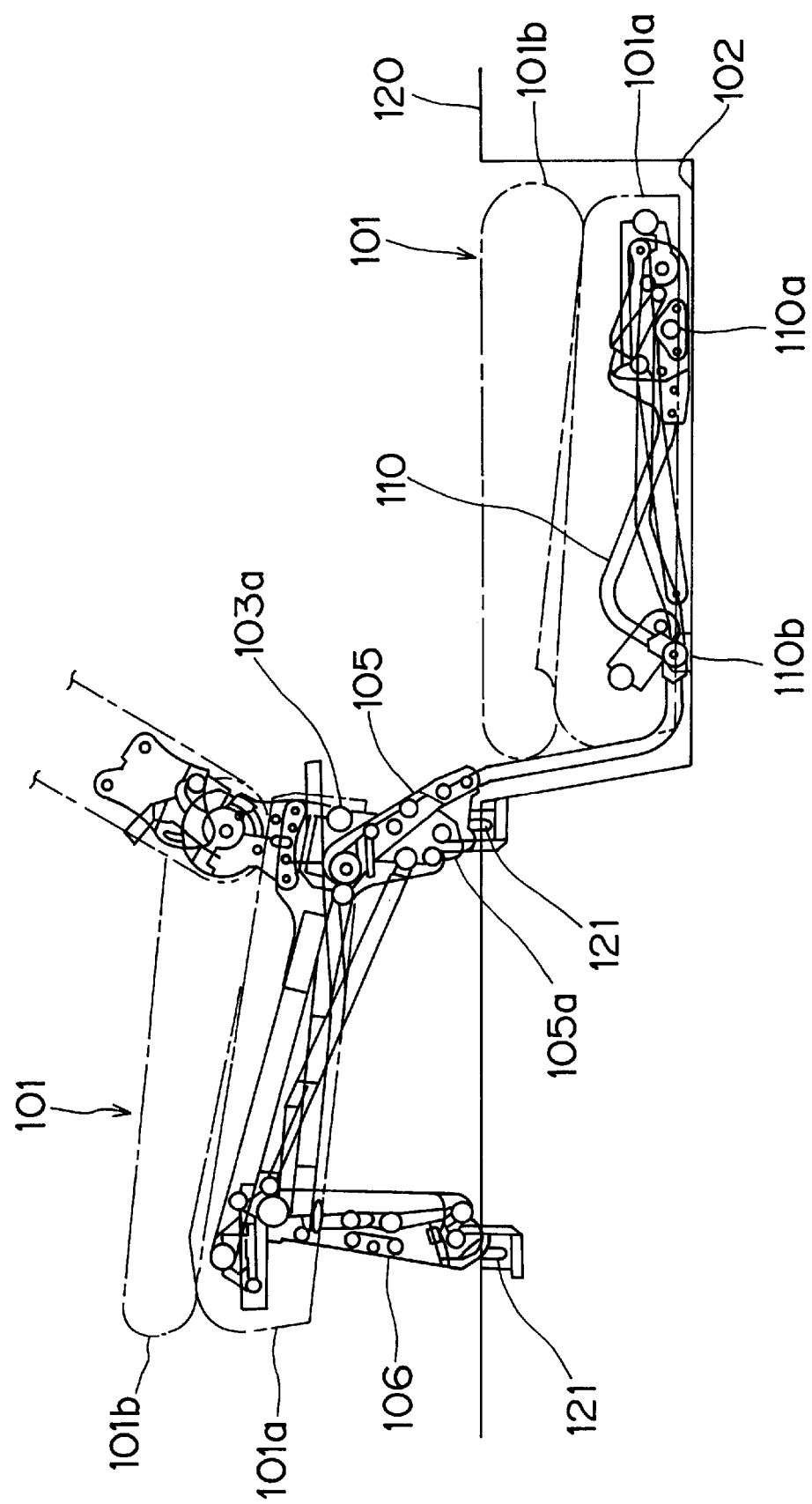
FIG. 11 is a side view showing a second embodiment according to the invention.
Figure 12:
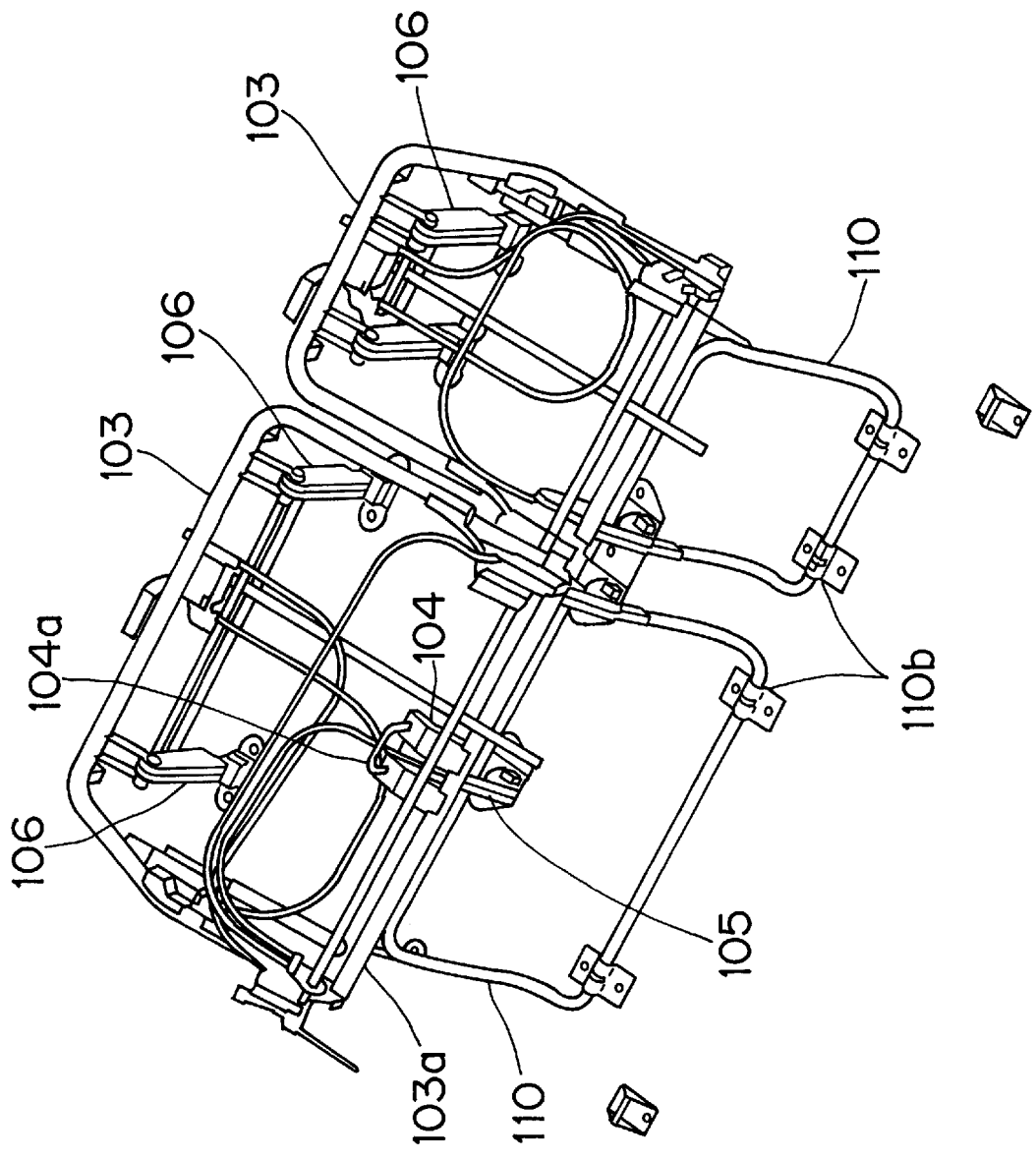
FIG. 12 is a perspective view showing the second embodiment according to the invention.
Figure 13:
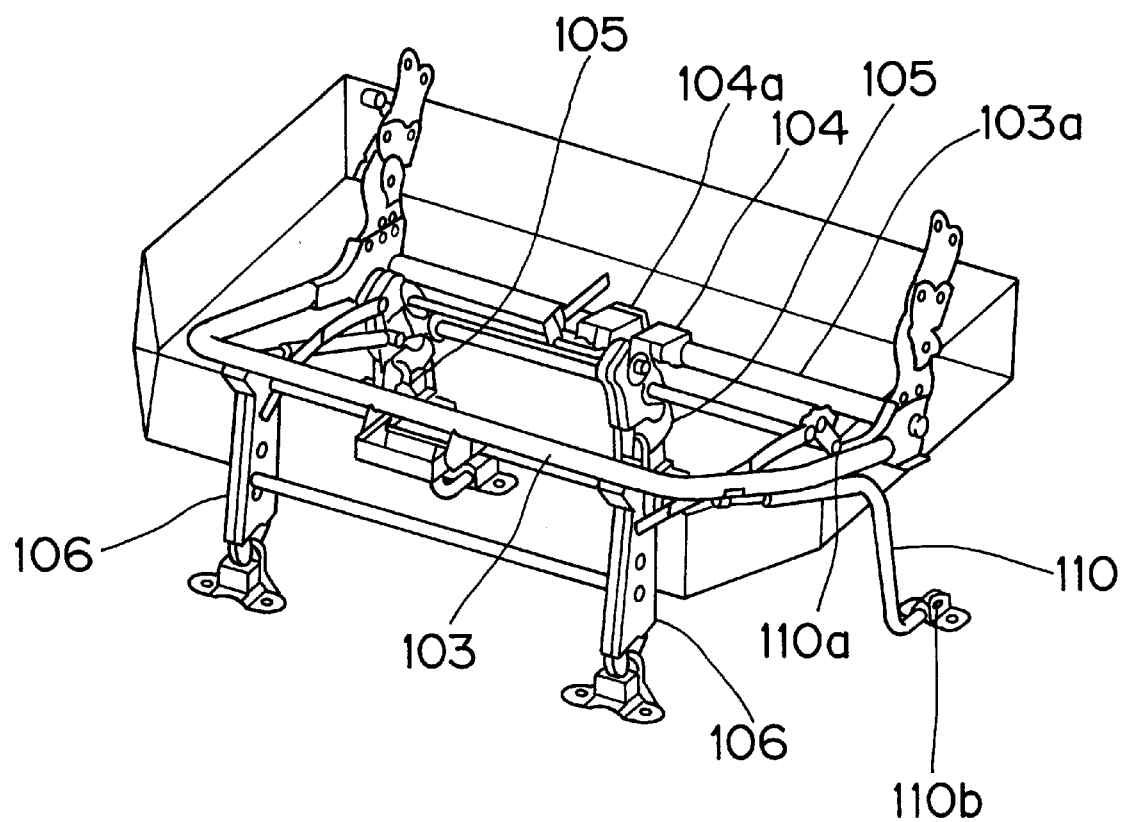
FIG. 13 is a perspective view showing an essential part of the second embodiment according to the invention.

Referring to FIGS. 11 to 13, a second embodiment of the present invention will be described.

FIG. 11 shows the application of the invention to the rear seat of the vehicle. A seat 101 includes a seat cushion 101*a* and a seat back 101*b*. In this embodiment, the seat back 101*b* of the seat 101 is folded down to the seat face of the seat cushion 101*a* such that the thus folded seat is brought into the storable state within a recessed storage portion 102 formed in the vehicle body floor 120 to the rear of the seat through a link member 110 that links the rear portion of the seat cushion 101*a* and the vehicle body floor 120.

In FIG. 12, a bracket 104 including a seat belt coupling portion 104a corresponding to two seat belts is attached to an intermediate portion of a rear rod 103a of a seat cushion frame 103 serving as a base of the seat cushion 101a. As shown in FIG. 11, a folding rear leg 105 with its one end as a fixing portion 105a fixed to the vehicle body floor 120 is pivotally connected to the bracket 104. The aforementioned structure makes it possible to fold the seat 101 so as to be easily stored in the recessed storage portion 102. In the invention, even when a force is applied to the seat belt when the seat is used, the rear rod is not pulled nor bent by the seat belt.

To be more specific, FIG. 12 shows a rear seat for three occupants that can be divided into 6:4, including large and small tow seats 101, 101 for two and one. The frame type seat cushion frames 103, 103 are buried in the bottom as the base for the respective seats 101. As seat belts for two are fitted with the seat 101 for two, a seat belt coupling portion 104a has to be attached to the center of the rear rod 103a of the seat cushion frame 103a, both ends of which are connected with each one end of two seat belts. Therefore, the force applied to the seat belt when the seat is used may cause the seat belt to pull and bend the center of the rear rod 103a.

Referring to FIG. 13, in the invention, the bracket 104 having a seat belt coupling portion 104a is attached to the intermediate portion of the rear rod 103a of the seat cushion frame 103. The bracket 104 is connected to a base of the folding leg 105 having its end as the fixing portion 105a fixed to the vehicle body floor 120. When the seat is in the useable state, it is structured to maintain the state in which the intermediate portion of the rear rod 103a provided with the seat belt coupling portion 104a is linked with the vehicle body floor 120 through the bracket 104 and the rear leg 105. As a result, even if the force is applied to the seat belt when the seat is used, the rear rod 103a is not pulled and bent by the seat belt because the seat belt coupling portion 104a is securely supported by the rear leg 105. Further, in the state where the occupant is seated, as the rear rod 103a is supported by the rear leg 105 serving as the reinforcement, the seat face can be kept in the stable state. Referring to FIG. 11, when the seat is in the useable state, the fixing portion 105a of the rear leg 105 is engaged with the striker 121 attached to the vehicle body floor 120. Then the rear leg 105 can be folded and stored within the seat cushion 101a so as not to be an obstacle. The aforementioned seat belt coupling portion 104a may be structured to couple the fixed side of both sides of the seat belt, or to couple either the female portion or male portion at the detachable side.

The link member 110 is formed of a member having a side face of substantially L shape. One end of the link member 110 is coupled rotatively with the rear portion of the seat cushion 101a through a hinge 110a, and the other end is coupled rotatively with the bottom front portion of the recessed storage portion 102 through a hinge 110b. It is structured to be brought into two states, the state in which the seat 101 is useable, and the state in which the seat 101 is stored in the recessed storage portion 102, by rotation of the link member 110 around the hinge 110b. The link member 110 is formed integrally with a this embodiment is different from the conventional link member having a bar shape for merely linking the rear bottom portion of the seat cushion 101a and the front bottom portion of the recessed storage portion 102. Therefore, during running of the vehicle, the folded seat 101 does not rotate nor oscillate. As a result, the operation for lifting the folded seat can be performed in the stable state.

In addition, as shown in FIG. 13, a front leg 106 is provided at the front bottom of the seat cushion 101a. When the seat is in the useable state, the front leg 106 is engaged with and fixed to a striker 121 attached to the vehicle body floor 120. When the seat is in the stored state, the front leg 106 can be folded and stored into the seat cushion 101a so as not to be an obstacle.

As shown in FIGS. 12 and 13, in this embodiment, the bracket 104 having the seat belt coupling portion 104a is attached to the intermediate portion of the rear rod 103a of the seat cushion frame 103. It is structured such that the fixing portion 105a as the end of the folding rear leg 105 having the base coupled with the bracket 104 is fixed to the striker 121 attached to the vehicle body floor 120. When the seat is in the useable state, it is so structured to maintain the link between the intermediate portion of the rear rod 103a to which the seat belt coupling portion 104a is attached and the vehicle body floor 120 through the bracket 104 and the rear leg 105. Even when the force is applied to the seat belt, the rear rod 103a is not pulled and bent by the seat belt because the bracket 104 is securely supported by the rear leg 105. Consequently, the weight and the cost can be reduced without providing a special reinforcement member for preventing the frame from bending as in the conventional structure. In this embodiment, the folding front leg 106 and the rear leg 105 are respectively engaged with the strikers 121 attached to the vehicle body floor 120, thus fixing the seat in the useable state. Therefore, when the seat is stored, projection and exposure of the strikers attached to the vehicle body floor are prevented, resulting in excellent operability and outer appearance.

In this embodiment, as shown in FIG. 11, when storing the seat 101 within the recessed storage portion 102, the seat back 101b is folded down to the seat face of the seat cushion 101a. Then the rear leg 105 and the front leg 106 which have been locked to the vehicle body floor 120 are released. In this state, the link member 110 is turned backward and moved into the recessed storage portion 102 to store the seat. Meanwhile, the seat 101 can be easily returned into the useable state from the stored state by reversely performing the foregoing procedures.

In this embodiment, when the seat is not in the useable state, it can be stored easily in the recessed storage portion formed in the vehicle body floor. When the seat is useable, the rear rod of the seat cushion frame cannot be pulled nor bent by the seat belt to which the force is applied.

Third Embodiment

Figure 14:
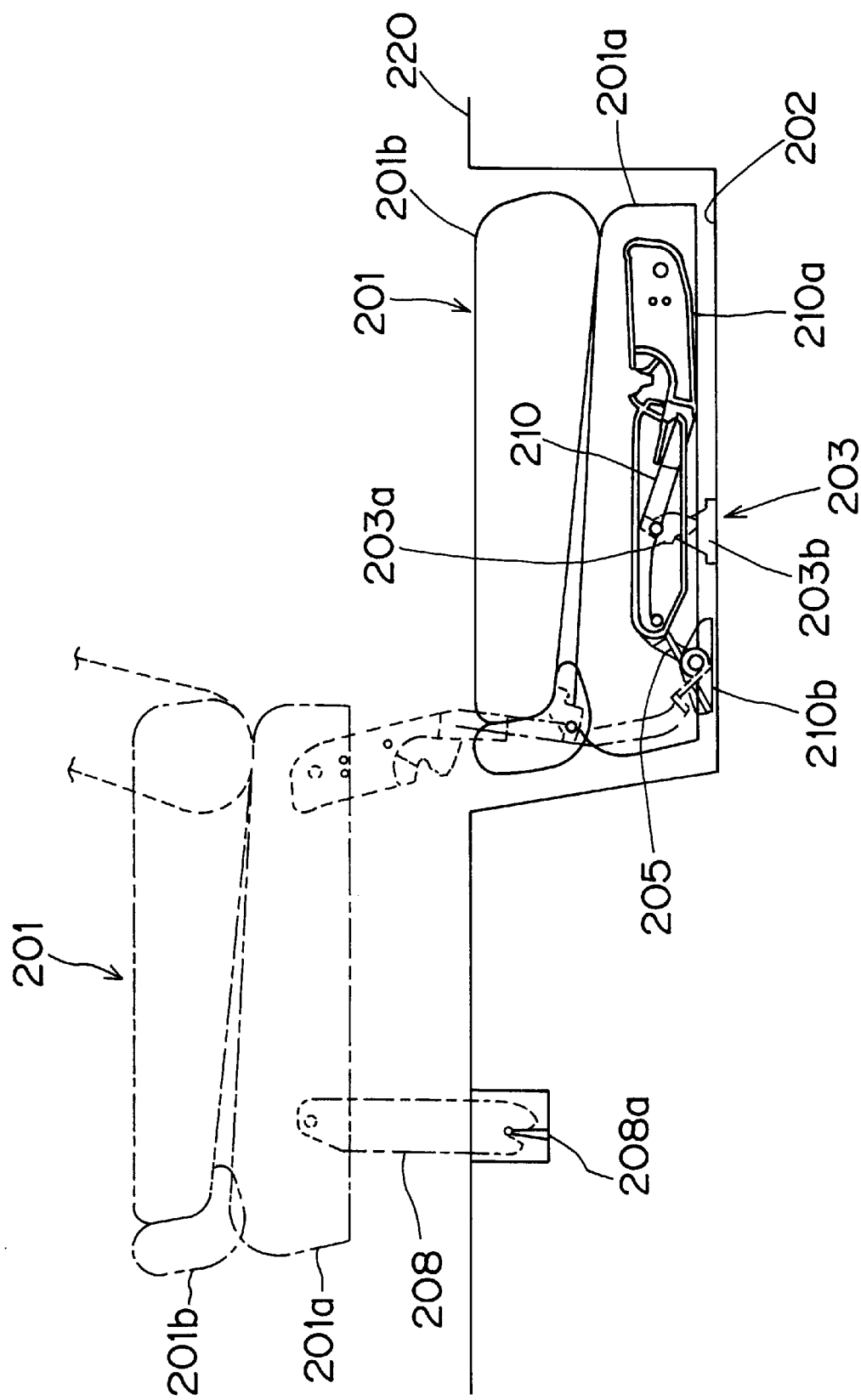
FIG. 14 is a side view showing a third embodiment according to the present invention.
Figure 15:
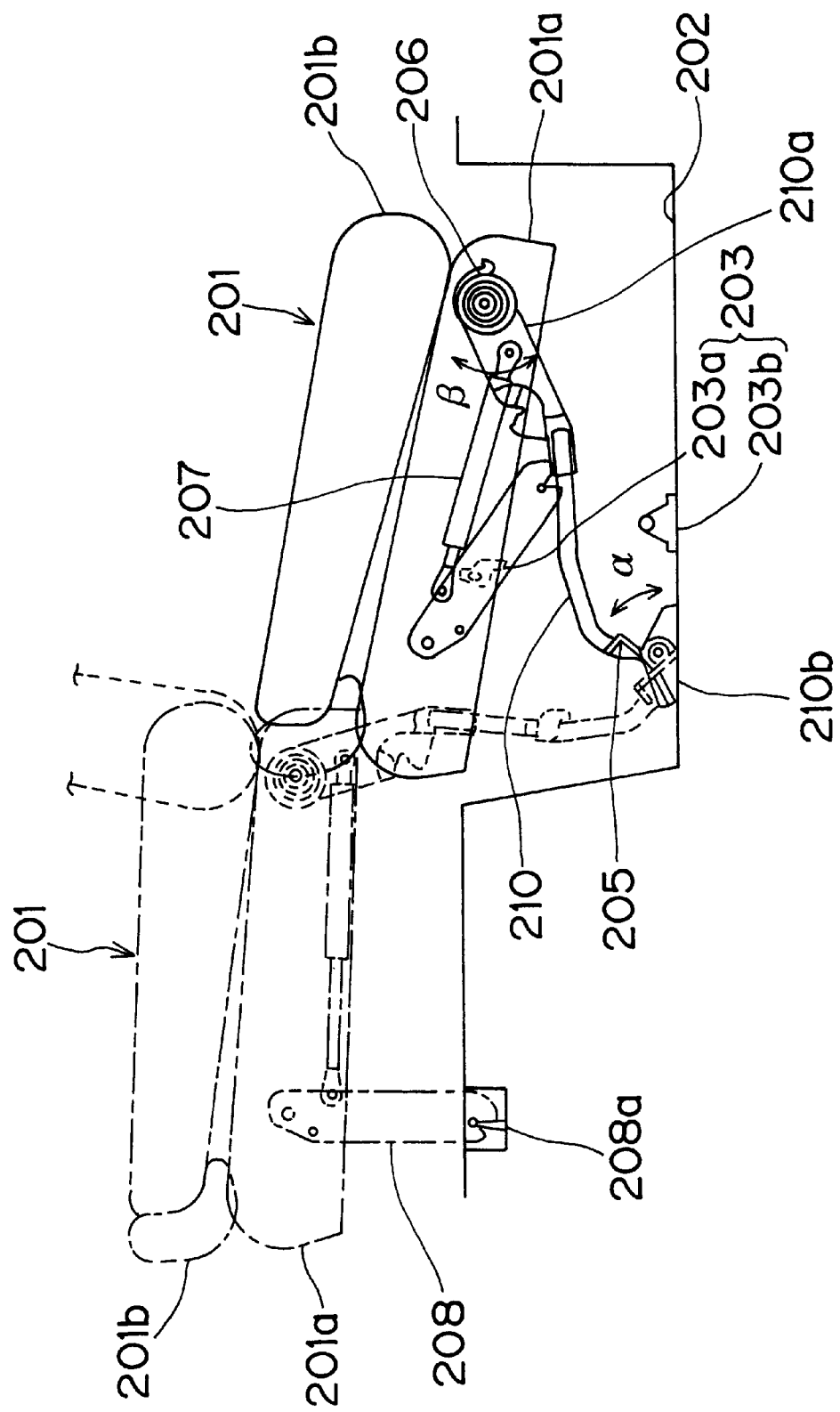
FIG. 15 is a side view showing another embodiment according to the invention.

Referring to FIGS. 14 and 15, a third embodiment of the invention will be described.

This embodiment shows the application of the invention to a seat for an automobile provided in the third row. Referring to FIGS. 14 and 15, a seat back 201b is folded down to a seat cushion 201a to bring the seat 201 into the folded state. The thus folded seat 201 is stored within a recessed storage portion 202 formed in the vehicle body floor 220 to the rear of the seat through a link member 210 that links the rear portion of the seat cushion 201a and the vehicle body floor 220. In this embodiment, a lock mechanism 203 for fixing the stored seat is provided.

The aforementioned lock mechanism 203 is, as shown in FIG. 14, formed by engaging a hook member 203a attached to a frame of the seat cushion 201a with a striker member 203b attached to a bottom face of the recessed storage portion 202. When the folded seat 201 is stored and fixed by the lock mechanism 203, the back face of the seat back 201b becomes flush with the vehicle body floor 220.

Besides, the invention may be structured in which the hook member 203a is provided with one end of a coupling member, for example, cable that extends rearward of the seat and link, the other end of the coupling member is rotatively attached to the intermediate portion of the link axially attached to the rear of the seat cushion, and a band that extends rearward and is pulled rearward is attached to a free end of the link member so as to release the lock mechanism 203.

In the aforementioned structure, the folded seat stored within the recessed storage portion 202 can be securely fixed in position. Moreover, the operation for locking and releasing the stored seat can be easily performed.

Referring to FIG. 15, the coupling portion of the link member 210 at the vehicle floor side is provided with a spring 205 that applies an elastic force in a direction to normally increase an opening angle α defined by the link member 210 and the bottom of the recessed storage portion 202. The coupling portion of the link member 210 at the seat side is provided with a spring 206 that applies an elastic force in a direction to normally expand an opening angle β defined by the link member 210 and the side face of the seat cushion 201a. As the elastic force of the springs 205, 206 is applied to keep the seat 201 lifted, the operation for lifting up the folded seat 201 can be easily performed. The elastic force of the springs 205, 206 may prevent the folded seat from dropping abruptly into the recessed storage portion 202, resulting in safe operation. Further, the lock state of the lock mechanism 203 can be reliably released by applying an elastic force in upward direction to the folded seat 201 stored in the recessed storage portion 202.

In the embodiment shown in FIG. 15, the spring 205 is attached to the coupling portion of the link member 210 at the vehicle floor side. The spring 206 is attached to the coupling portion of the link member 210 at the seat side. However, only the spring 205 may be attached to the coupling portion of the link member 210 at the vehicle floor side (refer to FIG. 14), or only the spring 206 may be attached to the coupling portion of the link member 210 at the seat side. According to the embodiment, the folded seat 201 stored within the recessed storage portion 202 can be easily lifted up with the aid of the spring action without_ requiring a greater force. In addition, when storing the folded seat 201 by folding down the seat back 201b to the seat face of the seat cushion 201a in the recessed storage portion 202, the spring supports the folded seat so as to be smoothly stored without being dropped abruptly in the recessed storage portion 202. A coil spring and a spiral spring may be used as the aforementioned springs 205, 206 for expanding the opening angle, respectively. Each of the springs 205, 206 applies an elastic force in the arrow direction to constantly act on the seat 201 with the upward force. However, it can be understood that any kind of spring may be used so long as the similar effect can be obtained.

The link member 210 is formed of an L shaped member, having one end rotatively coupled with the rear portion of the seat cushion 201a through a hinge 210a, and the other end rotatively coupled with the bottom front of the recessed storage portion 202 through a hinge 210b. The invention is structured to bring the seat 201 into two states, the state in which the seat is useable and the state in which the seat is stored within the recessed storage portion 202 by rotating the link member 210 around the hinge 210b.

The link member 210 is integrally formed with a substantially U shaped frame in the plan view. The link member 210 of this embodiment is different from the conventional link member having a bar shape that merely links the rear bottom of the seat cushion 201a and the front bottom of the recessed storage portion 202. Therefore, during running of the vehicle, the folded seat 201 does not rotate nor oscillate, thus allowing the operation for lifting up the folded seat in the stable state.

In addition, an elastic member 207 for keeping the folded seat 201 stored in the recessed storage portion 202 substantially horizontal extends between the link member 210 and the seat cushion 201a. The elastic member 207 and the springs 205, 206 act to balance with the load of the seat so as to constantly keep the folded seat 201 in horizontal state easily. In addition, this elastic member 207 has an effect to increase the biasing force to the direction where the seat 201 becomes useable as it is returned to the original position. This makes it possible to assist the operation for moving the seat 201 from the stored state to the useable state, resulting in excellent operability. A dumper using hydraulic pressure, coil spring or the like can be used as the elastic member 207.

Referring to FIG. 15, a front leg 208 is attached to the bottom front of the seat cushion 201a. When using the seat, the front leg 208 is brought into engagement with a striker 208a attached to the vehicle body floor 220 and fixed thereto. When storing the seat, the front leg 208 is folded in the seat cushion 201a so as not to be an obstacle.

The thus structured embodiment is provided with a lock mechanism 203 for fixing the stored seat. The lock mechanism 203 can be remotely operated to release the lock state. The aforementioned structure, thus, makes it possible to securely fix the folded seat stored in the recessed storage portion 202 in position. Additionally the folded seat can be locked to and released from the vehicle body floor easily. The link member 210 has one end rotatively connected to the rear of the seat cushion 201a, and the other end linked rotatively to the recessed storage portion 202. In case of arranging an expansion spring at one of a coupling portion of the link member 210 at the seat side and a coupling portion of the link member 210 at the vehicle floor side, or expansion springs at both portions as shown in FIG. 15, the elastic force generated by the springs 205, 206 acts on the seat 201 so as to be constantly kept lifted in the upward direction. Therefore, the folded seat 201 in the stored state can be easily lifted to the useable state without requiring greater force. When storing the seat in the useable state into the recessed storage portion 202, it can be smoothly and safely stored by preventing the folded seat from dropping into the recessed storage portion abruptly. In the case where those expansion springs 205, 206 are provided, the folded seat 201 can be securely fixed in position within the recessed storage portion 202. Accordingly the seat can be stored within the recessed storage portion 202 in the completely folded state (that is, the folded seat has a minimum height). This makes it possible to realize compact design requiring no recessed storage portion with a greater depth.

In the stored state of the seat provided with the hook member 203a of the lock mechanism 203, that is, the frame of the seat cushion 201a, it is constantly kept lifted in the upward direction. This makes it possible to prevent generation of oscillation of the hook member 203a and the striker 203b.

Extended between the link member 210 and the seat cushion 201a is the elastic member 207 for increasing the biasing force in the direction where the seat 201 is returned to the original useable position. The stored seat can be lifted to be brought into the useable state easily, requiring less force, thus simplifying the lifting operation. As the seat 201 is brought into the useable state, the biasing force of the springs 205, 206 to lift the seat is decreased. However, the biasing force of the elastic member 207 serves to compensate the decrease in the biasing force, thus keeping the seat 201 lifted. When lifting the stored seat 201 to be brought into the useable state, a constant force for lifting the seat is applied thereto, resulting in excellent operability.

The seat 201 is stored by folding the seat back 201b down to the seat cushion 201a, releasing the lock state of the front leg 208, and rotating the link member 210 rearward into the recessed storage portion 202. Meanwhile, the seat 201 can be lifted to be brought into the useable state by performing the aforementioned procedure reversely. Both operations for storing the seat in the recessed storage portion 202 and bringing the seat 201 into the useable state can, thus, be performed easily.

As has been clarified from the foregoing description, in the present invention, the folded seat can be securely fixed in position within the recessed storage portion. This makes it possible to prevent generation of noise caused by the stored seat in the recessed storage portion during running of the vehicle. In addition, the stored seat can be easily fixed and the locked state can also be easily released, thus providing excellent operability. In the case where the coupling portion of the link member is further provided with the spring, the folded seat can be smoothly stored within the recessed storage portion formed in the vehicle body floor safely by preventing it from abruptly dropping.

What is claimed is:

1. A storage type seat for an automobile, comprising:
   a seat cushion having at least one leg portion;
   a lock mechanism operable to engage and disengage the at least one leg portion with and from a vehicle body floor;
   a seat back that can be folded down to a seat face of the seat cushion;
   a link member that links the seat with the vehicle body floor, the vehicle body floor having a recessed storage portion formed therein to the rear of the seat, the link member allowing the seat cushion and the seat back that are in a folded state to be stored in the recessed storage portion when the seat is not used, and allows the seat cushion and the seat back in the folded state to be returned to an original position for use so that the leg portion is brought into engagement with the vehicle body floor;
   a release permission mechanism which includes a control lever operating the lock mechanism, wherein a movement of the control lever is not transmitted to the lock mechanism when the seat cushion and the seat back are not in the folded state, and wherein the movement of the control lever is transmitted to the lock mechanism and the release permission mechanism permits the leg portion of the seat cushion to be released from the vehicle body floor when the seat cushion and the seat back are in the folded state; and
   wherein the release permission mechanism is connected by a connecting member to a reclining mechanism folding the seat back in the folded state.

2. A storage type seat according to claim 1, wherein the release permission mechanism operates in association with the reclining mechanism.

3. A storage type seat according to claim 1, wherein the at least one leg portion is attached to at least one of a front portion and a rear portion of a bottom of the seat cushion.

4. A storage type seat according to claim 2, wherein the at least one leg portion is attached to at least one of a front portion and a rear portion of a bottom of the seat cushion.

5. A storage type seat according to claim 1, wherein the release permission mechanism includes:

a open lever that releases a lock by the lock mechanism in association with the control lever when the seat back is in the folded state; and
   a cancel lever connected by a cable to the reclining mechanism, and operating the control lever in association with the open lever when the seat back is in the folded state.

6. A storage type seat according to claim 5, wherein both of the control lever and the cancel lever include long holes, and
   wherein a cancel pin is inserted to the long holes so that the control lever is operated in association with the open lever, or the control lever is not operated in association with the open lever in accordance with a movement of the cancel lever based on the state of the seat.

7. A storage type according to claim 1, wherein the release permission mechanism includes:
   a open lever connected by a cable to the lock mechanism;
   a mechanism operating the control lever in association with the open lever when the seat back is in the folded state, and operating the control lever and the open lever separately when the seat back is not in the folded state.

8. A storage type seat according to claim 1, further comprising a standing permission mechanism which permits the seat back of the seat in the folded state to be raised to a standing position only when the leg portion is locked on the vehicle body floor by the lock mechanism.

9. A storage type seat according to claim 8, wherein the standing permission mechanism operates in association with the reclining mechanism.

10. A storage type seat according to claim 8, wherein the at least one leg portion is attached to at least one of a front portion and a rear portion of a bottom of the seat cushion.

11. A storage type seat for an automobile, comprising:
    a seat cushion having at least one leg portion;
    a lock mechanism operable to engage and disengage the at least one leg portion with and from a vehicle body floor;
    a seat back that can be folded down to a seat face of the seat cushion and stands up from the seat face of the seat cushion by an operation of a release arm provided with a reclining mechanism;
    a first link member that links the seat with the vehicle body floor, the vehicle body floor having a recessed storage portion formed therein to the rear of the seat, the first link member allowing the seat cushion and the seat back that are in a folded state to be stored in the recessed storage portion when the seat is not used, and allows the seat cushion and the seat back in the folded state to be returned to an original position for use so that the leg portion is brought into engagement with the vehicle body floor; and
    a standing permission mechanism including a second link member that is connected to the lock mechanism and an engage portion provided on the release arm,
    wherein the second link member engages with the engage portion when the leg portion is not locked on the vehicle body floor by the lock mechanism,
    wherein the second link member does not engage with the engage portion, and the standing permission mechanism permits the seat back of the seat in the folded state to be raised to a standing position when the leg portion is locked on the vehicle body floor by the lock mechanism.

* * * * *